(12) United States Patent
Solà Gil

(10) Patent No.: US 11,787,645 B2
(45) Date of Patent: Oct. 17, 2023

(54) CONVEYOR DEVICE FOR CONVEYING FLEXIBLE CONTAINERS ALONG A PACKAGING LINE

(71) Applicant: MESPACK, SL, Santa Perpetua de Mogoda (ES)

(72) Inventor: Josep Solà Gil, Vacarisses (ES)

(73) Assignee: MESPACK, SL, Santa Perpetua de Mogada (ES)

( * ) Notice: Subject to any disclaimer, the term of this patent is extended or adjusted under 35 U.S.C. 154(b) by 219 days.

(21) Appl. No.: 17/613,017

(22) PCT Filed: Jan. 28, 2020

(86) PCT No.: PCT/EP2020/052044
§ 371 (c)(1),
(2) Date: Nov. 19, 2021

(87) PCT Pub. No.: WO2020/239272
PCT Pub. Date: Dec. 3, 2020

(65) Prior Publication Data
US 2022/0315356 A1   Oct. 6, 2022

(30) Foreign Application Priority Data

May 27, 2019 (EP) ...................................... 19382421

(51) Int. Cl.
*B65G 47/90* (2006.01)
*B65B 43/46* (2006.01)

(52) U.S. Cl.
CPC .......... *B65G 47/907* (2013.01); *B65B 43/465* (2013.01); *B65G 2201/0238* (2013.01)

(58) Field of Classification Search
CPC ................. B65G 47/90; B65G 47/907; B65G 2201/0238; B65B 46/46; B65B 43/465
USPC ....................................... 198/468.2
See application file for complete search history.

(56) References Cited

U.S. PATENT DOCUMENTS

| | | | | |
|---|---|---|---|---|
| 4,453,882 A | * | 6/1984 | Mang .................... | B65G 47/902 74/53 |
| 4,787,310 A | * | 11/1988 | Tiemann ............. | B41F 15/0877 101/40 |
| 6,435,336 B1 | * | 8/2002 | Knodler ................. | B21K 27/04 198/470.1 |

(Continued)

FOREIGN PATENT DOCUMENTS

EP            3315424 A1 * 5/2018 ............. B65B 43/16

*Primary Examiner* — Douglas A Hess
(74) *Attorney, Agent, or Firm* — Robert J. Hess; Hess Patent Law Firm

(57) ABSTRACT

The conveyor device for conveying flexible containers along a packaging line comprises a track (1) defining a horizontal closed path and one or more pairs of left and right movers (2a, 2b) movably mounted on the track (1) for moving along the path by the effect of active and reactive elements configured for independently driving and controlling the left and right movers along the path, pairs of left and right gripper arms (3a, 3b) pivotally connected to the left and right movers (2a, 2b) by respective left and right articulations (6a, 6b) about vertical axes, and one or more pairs of left and right clamps (4a, 4b) respectively mounted on the left and right gripper arms (3a, 3b) and configured for gripping one or more flexible containers (5) in a vertical position. The left and right gripper arms (3a, 3b) are linked together by a parallelism-keeping mechanism.

18 Claims, 8 Drawing Sheets

(56) References Cited

U.S. PATENT DOCUMENTS

| | | | | |
|---|---|---|---|---|
| 6,530,735 | B1* | 3/2003 | Trammell | H01L 21/68707 414/730 |
| 7,748,517 | B2* | 7/2010 | Caunter | B65H 5/14 198/470.1 |
| 9,221,569 | B2* | 12/2015 | Nakamoto | B65B 43/50 |
| 10,196,164 | B2* | 2/2019 | Nakamoto | B65G 47/842 |
| 10,600,441 | B1* | 3/2020 | Altknecht | G11B 17/225 |
| 11,554,555 | B2* | 1/2023 | Keikhaee | B29C 65/7802 |
| 11,713,147 | B2* | 8/2023 | Duperray | B65B 21/06 198/469.1 |
| 2009/0158694 | A1* | 6/2009 | Matheyka | |

* cited by examiner

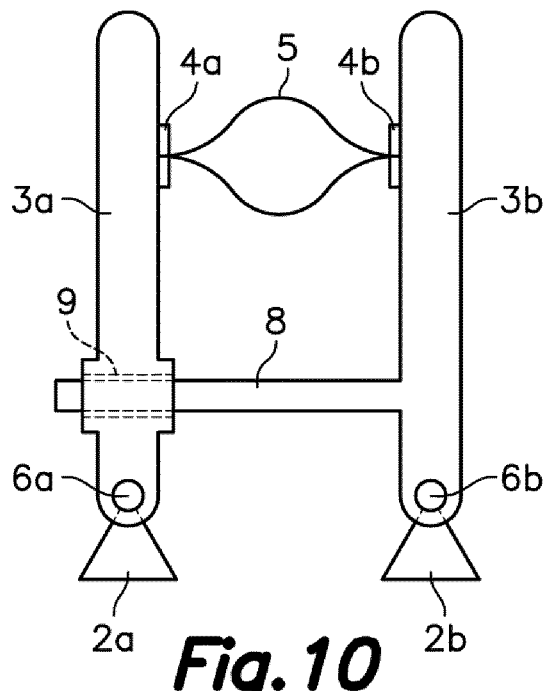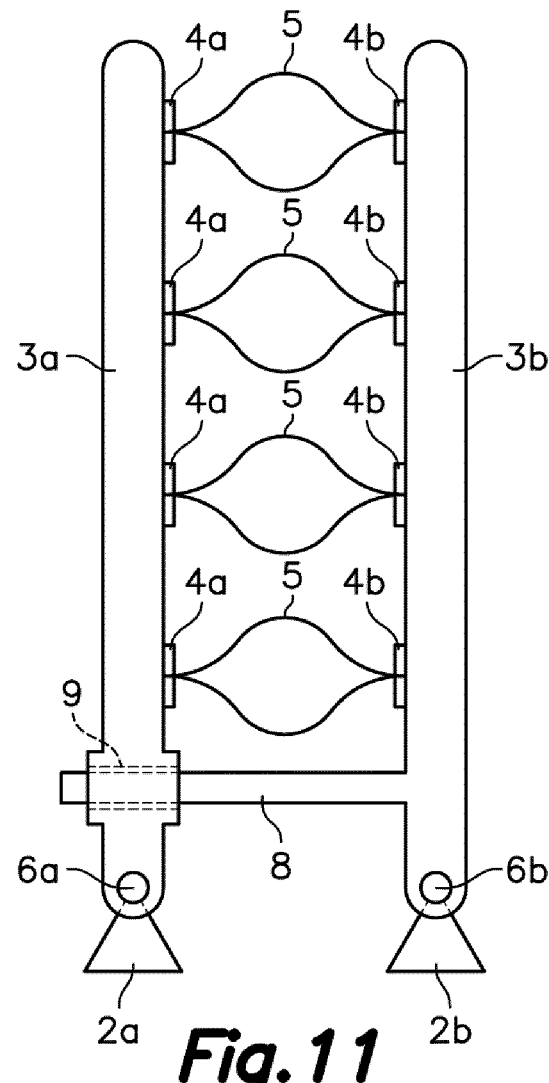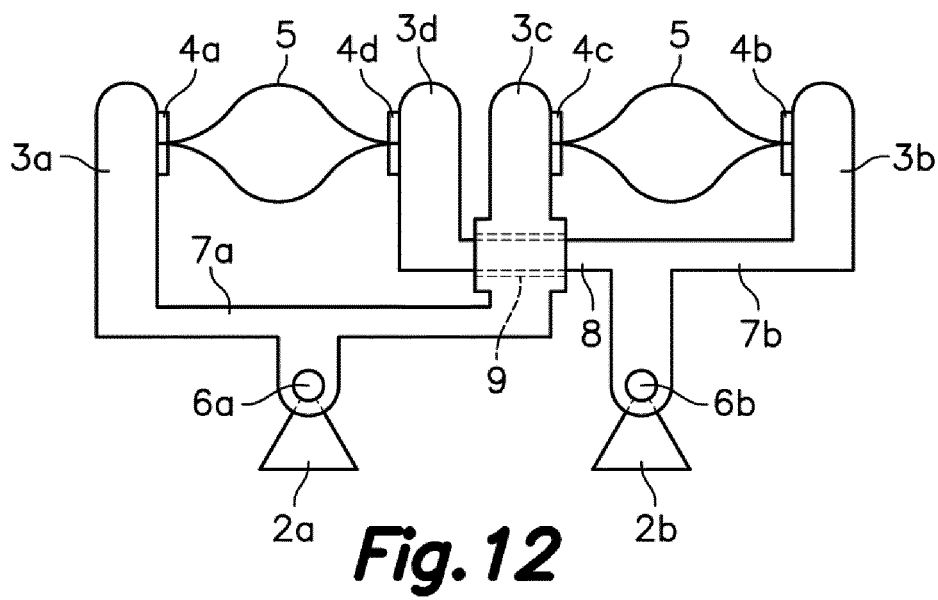

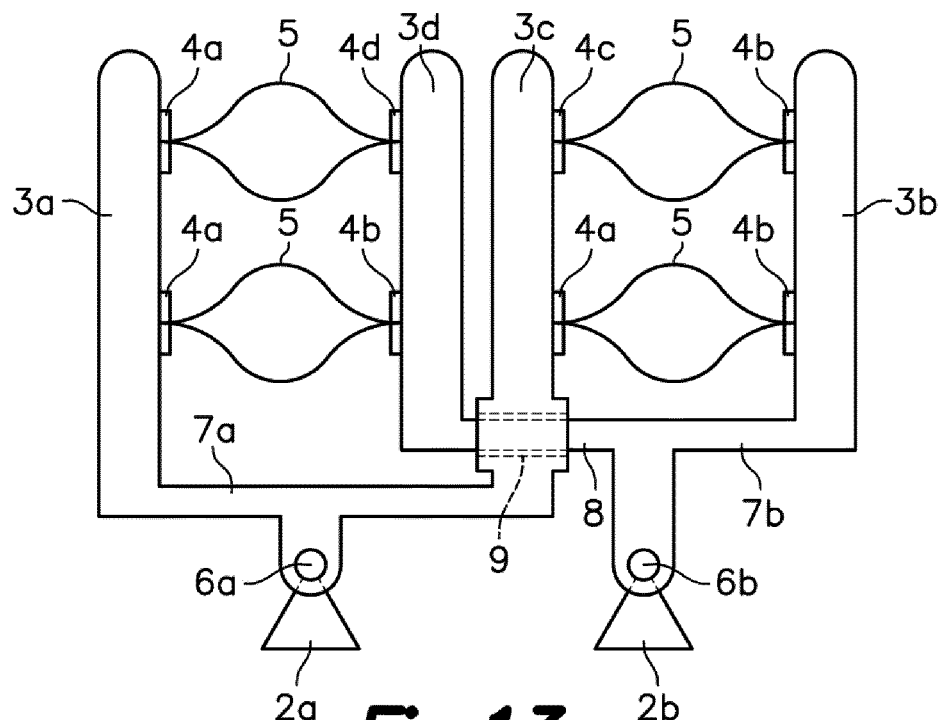
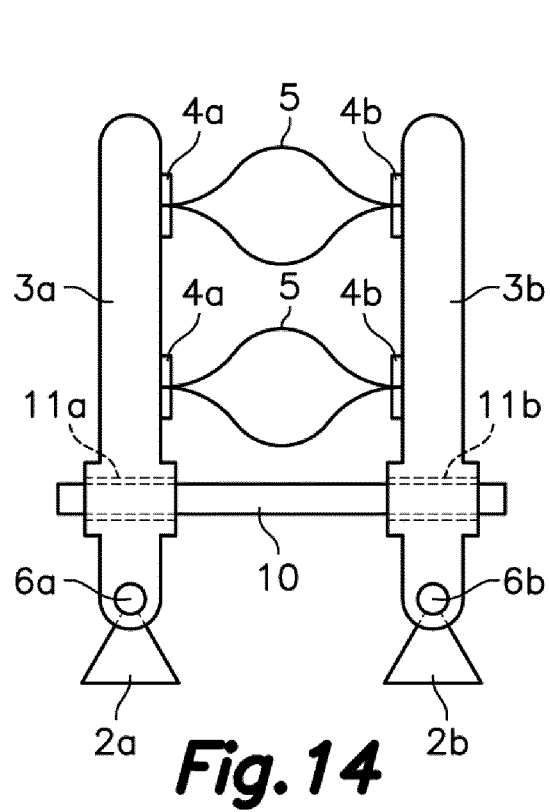
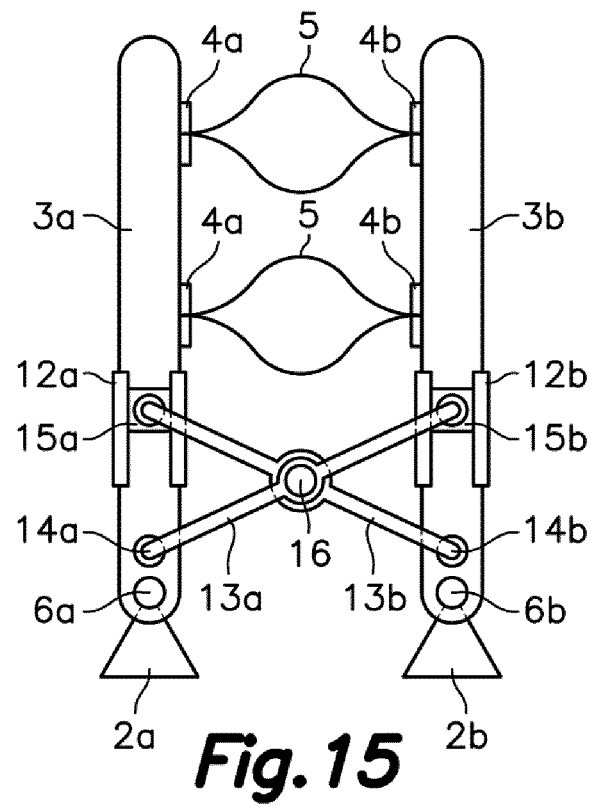

CONVEYOR DEVICE FOR CONVEYING FLEXIBLE CONTAINERS ALONG A PACKAGING LINE

TECHNICAL FIELD

The present invention generally relates to a conveyor device for conveying flexible containers along a packaging line, and more in particular to a conveyor device for conveying flexible containers hanging in a vertical position along a packaging line including one or more filling units and a sealing unit.

BACKGROUND OF THE INVENTION

Horizontal-type automatic packaging machines are known including a conveyor device moving a plurality of carriages along a closed path provided with a work section, along which successive operating units such as one or more filling units and a sealing unit are installed, and a return section, wherein each carriage comprises a base supporting at least one pair of gripper arms provided with one or more pairs of clamps, each pair of clamps being configured for gripping a flexible container at opposite side edges thereof with the flexible container in a vertical position.

Document EP 3321195 A1 discloses a conveyor device of the type described above wherein the closed path is defined in a horizontal plane by a rail. The work section of the closed path is a straight work section that runs through the operating units and the return section includes straight and curved portions. The carriages are coupled to the rail and, in one embodiment, are intermittently driven by a drum cam along the straight work section and continuously driven by an endless roller chain along the return section. Each carriage has a base and two pairs of mutually parallel gripper arms which project from the base in a direction perpendicular to the straight work section and which are connected to the base by guides parallel to the straight work section. The gripper arms are linked to a mechanism operated by a cam follower couplable to cams external to the conveyor for moving the gripper arms of each pair towards each other, whereby the gripped flexible containers are relaxed and an upper opening thereof is open to allow the filling thereof, or away from each other, whereby the gripped flexible containers are stretched and the upper opening thereof is closed.

A drawback with the conveyor device of document EP 3321195 A1 is that the carriages admit a limited container size range and need to be replaced or mechanically adjusted for adapting the conveyor to flexible containers having different formats exceeding that limited container size range. Another drawback is that any change in the configuration of the operating units forces to replace the drum cam which intermittently or continuously drives the carriages along the work section. Still another drawback is that any change in the configuration of the operating units forces to modify the configuration of the cams external to the conveyor which move the gripper arms of each pair towards each other and away from each other in order to open and close the upper aperture of the gripped flexible containers.

Document US 2003230941 A1 discloses a controlled motion system which has a plurality of movers that are movably mounted on a track for moving along a path. Active and reactive elements are associated with the track and with each mover, and are configured for driving and controlling the movers along the path. A controller is operatively associated with the active elements for controlling the driving of the movers, and position sensors are associated with the track and configured for sensing position information corresponding to the position of the movers along the path. The sensors are associated with the controller for transmitting the position information to the controller, and the controller is configured for controlling the active elements such that each mover is controlled independently from the others.

Document WO 2014207278 A1 discloses a conveyor device for conveying flexible containers along a packaging line comprising a controlled motion system of the type of that disclosed in the cited document US 2003230941 A1 defining a track along a closed path oriented in in a vertical plane and a plurality of pairs of left and right movers movably mounted for moving along the closed path, wherein the closed path has a straight horizontal work upper section that runs through operating units and a lower return section including straight and curved portions. A plurality of pairs of gripper arms are provided, with each pair including a left gripper arm rigidly connected to a left mover and a right gripper arm rigidly connected to a right mover. A left clamp is mounted on the left gripper arm and a right clamp is mounted on the right gripper arm of each pair. The left and right clamps are configured for gripping a flexible container at opposite side edges thereof with the flexible container in a vertical position.

In the conveyor device of the cited document WO 2014207278 A1, a controller individually controls the movements of the left and right movers along the closed path so as to intermittently stop at each operating unit along the work section, to keep the pairs of left and right gripper arms at selected distances therebetween so as to open and close the upper opening of the gripped containers or so as to adapt the conveyor device to flexible containers having different formats.

A drawback with the conveyor device of the cited document WO 2014207278 A1 is that the work section of the closed path running through the operating units is limited to a straight horizontal work upper section due to the fact that the closed path is oriented in a vertical plane. If the closed path were oriented in a horizontal plane, then the gripper arms would lose their parallelism in the curved sections due to the fact that the gripper arms are rigidly connected to the movers, thereby the work section would be still limited to a straight section.

DISCLOSURE OF THE INVENTION

The present invention contributes to overcome the aforementioned drawbacks by providing a conveyor device for conveying flexible containers along a packaging line comprising a track which defines a closed path, one or more pairs of movers, each pair including a left mover and a right mover movably mounted on the track for moving along the path, and active and reactive elements associated with the track and the left and right movers. The active and reactive elements are configured for independently driving and controlling the left and right movers along the path in cooperation with a programmable controller as per a known controlled motion system. The conveyor device further comprises one or more pairs of gripper arms, each pair including a left gripper arm connected to the left mover and a right gripper arm connected to the right mover, one or more pairs of clamps, each pair including a left clamp mounted on the left gripper arm and a right clamp mounted on the right gripper arm. The left and right clamps are configured for gripping a flexible container at opposite side edges thereof with the flexible container in a vertical position.

Throughout this specification, the terms "left" and "right" are used as seen from inside to outside of the closed path.

In the conveyor device of the present invention, the closed path defined by the track lays in a horizontal plane and includes straight and curved sections, the left gripper arm is pivotally connected to the left mover by a left articulation about a vertical axis and the right gripper arm is pivotally connected to the right mover by a right articulation about a vertical axis. The left and right gripper arms are linked together by a parallelism-keeping mechanism configured for keeping the left and right gripper arms mutually parallel and with the left and right clamps facing each other in both the straight and curved sections of the path even when a distance between the left and right articulations is varied due to the relative movements of the left and right movers.

Each pair of left and right movers together with the one or more pairs of left and right gripper arms pivotally connected thereto and linked together by the parallelism-keeping mechanism, and the one or more pairs of left and right clamps mounted on the left and right gripper arms, together constitute a container-carrying unit admitting a container size range much wider than the limited container size range of the prior art.

By virtue of the controlled motion system, each container-carrying unit is able to grip and hold one or more flexible containers in a vertical position, to adapt to flexible containers of different formats having different sizes within the wider set up size range, move the flexible containers forward and backward at variable speeds along the path, keep the flexible containers stationary at selected positions of the path and close and open an upper opening of each flexible container by stretching and relaxing it either when being stationary or in motion and either in a straight or curved section of the path.

In an embodiment, the parallelism-keeping mechanism comprises a linear guide perpendicular to the left and right gripper arms attached to one of the left and right gripper arms and a guide follower attached to the other of the left and right gripper arms and slidingly coupled to the linear guide.

In another embodiment, the parallelism-keeping mechanism comprises a linear guide bar, a left guide follower perpendicular to the left gripper arm attached to the left gripper arm and slidingly coupled to the linear guide bar and a right guide follower perpendicular to the right gripper arm attached to the right gripper arm and slidingly coupled to the linear guide bar.

In still another embodiment, the parallelism-keeping mechanism comprises a left linear guide parallel and attached to the left gripper arm, a right linear guide parallel and attached to the right gripper arm, a first rocker bar having a first end pivotally connected to the left gripper arm by a left articulation about a vertical axis and a second end pivotally connected to a right guide follower slidingly coupled to the right linear guide, and a second rocker bar having a first end pivotally connected to the right gripper arm by a right articulation about a vertical axis and a second end pivotally connected to a left guide follower slidingly coupled to the left linear guide, wherein the first and second rocker bars are pivotally connected to one another at an intermediate crossing point thereof by an intermediate articulation about a vertical axis.

In an additional embodiment, the parallelism-keeping mechanism comprises an intermediate body, first and second left rocker bars, and first and second right rocker bars. The first and second left rocker bars have respective first ends pivotally connected to the left gripper arm by respective first and second left articulations about vertical axes and respective second ends pivotally connected to the intermediate body by respective first and second left intermediate articulations about vertical axes. The first and second right rocker bars have respective first ends pivotally connected to the right gripper arm by respective first and second right articulations about vertical axes and respective second ends connected to the intermediate body by respective first and second right intermediate articulations about vertical axes. The first and second left rocker bars together with the left gripper arm and the intermediate body form a left articulated parallelogram and the first and second right rocker bars together with the right gripper arm and the intermediate body form a right articulated parallelogram.

Optionally, in this additional embodiment, the parallelism-keeping mechanism further comprises mutually meshed left and right toothed wheels coaxial to the second left and right intermediate articulations and fixed to the second left and right rocker bars, respectively, wherein the left and right toothed wheels have a same diameter.

In a variation of this additional embodiment, the parallelism-keeping mechanism further comprises, instead of the mutually meshed left and right toothed wheels, an intermediate linear guide parallel to the left and right gripper arms attached to the intermediate body, a third left rocker bar having a first end pivotally connected to the left gripper arm by a third left articulation about a vertical axis and a second end pivotally connected to a guide follower slidingly coupled to the intermediate linear guide, and a third right rocker bar having a first end pivotally connected to the right gripper arm by a third right articulation about a vertical axis and a second end pivotally connected to the guide follower.

In still another additional embodiment, the left gripper arm is a first left gripper arm fixed to a left arm support and a second left gripper arm parallel to the first left gripper arm is fixed to the left arm support. Similarly, the right gripper arm is a first right gripper arm fixed to a right arm support and a second right gripper arm parallel to the first right gripper arm is fixed to the right arm support. The left arm support is pivotally connected to the left mover by the left articulation and the right arm support is pivotally connected to the right mover by the right articulation. The left and right arm supports are arranged such that the first left gripper arm is paired with the second right gripper arm and the second left gripper arm is paired with the first right gripper arm.

In this still another additional embodiment, the one or more left clamps are one or more first left clamps mounted on the first left gripper arm and the one or more right clamps are one or more first right clamps mounted on the first right gripper arm, one or more second left clamps are mounted on the second left gripper arm and one or more second right clamps are mounted on the second right gripper arm. The one or more second left clamps are paired with the one or more first right clamps and the one or more second right clamps are paired with the one or more first left clamps for gripping one or more pairs of flexible containers at opposite side edges thereof with the flexible containers in a vertical position.

The parallelism-keeping mechanism comprises, for example, a linear guide perpendicular to the first and second left and right gripper arms attached to one of the left and right arm supports and a guide follower attached to the other of the left and right arm supports and slidingly coupled to the linear guide.

With this configuration, the parallelism-keeping mechanism keeps the first left gripper arm, the second right gripper arm, the second left gripper arm and the first right gripper arm mutually parallel, with the first left clamps and the second right clamps facing each other and with the second left clamps and the first right clamps facing each other in both the straight and curved sections of the path even when a distance between the left and right articulations is varied due to the relative movements of the left and right movers.

BRIEF DESCRIPTION OF THE DRAWINGS

The invention will be more fully understood from the following detailed description of several exemplary embodiments with reference to accompanying drawings, in which:

FIG. 10 is a top plan diagrammatic view of a first variant of the container-carrying unit shown in FIGS. 1 to 9;

FIG. 11 is a top plan diagrammatic view of a second variant of the container-carrying unit shown in FIGS. 1 to 9;

FIG. 12 is a top plan diagrammatic view of a container-carrying unit belonging to a conveyor device for conveying flexible containers along a packaging line according to a second embodiment of the present invention;

FIG. 13 is a top plan diagrammatic view of a variant of the container-carrying unit shown in FIG. 12;

FIG. 14 is a top plan diagrammatic view of a container-carrying unit belonging to a conveyor device for conveying flexible containers along a packaging line according to a third embodiment of the present invention;

FIG. 15 is a top plan diagrammatic view of a container-carrying unit belonging to a conveyor device for conveying flexible containers along a packaging line according to a fourth embodiment of the present invention;

DETAILED DESCRIPTION OF SEVERAL EMBODIMENTS

Referring first to FIGS. 1 to 9, a conveyor device for conveying flexible containers along a packaging line according to a first embodiment of the present invention is described.

Figure 1:
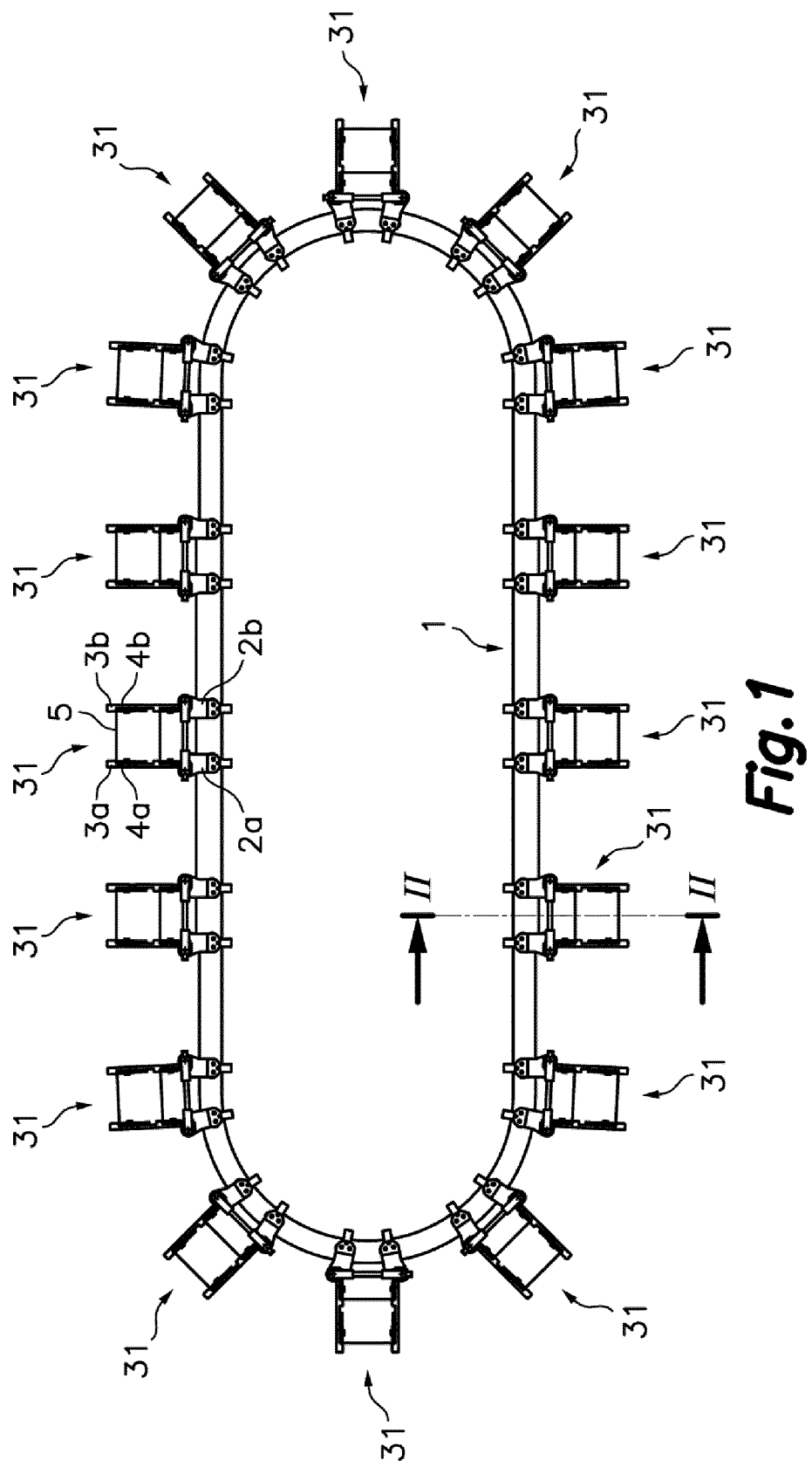
FIG. 1 is a top plan view of a conveyor device for conveying flexible containers along a packaging line according to a first embodiment of the present invention.

As shown in FIG. 1, the conveyor device comprises a track 1 defining a closed path and a plurality of container-carrying units 31 arranged to move along the path. The closed path defined by the track 1 lays in a horizontal plane and includes straight and curved sections. Each container-carrying unit 31 comprises one pair of adjacent movers 2*a*, 2*b* including a left mover 2*a* and a right mover 2*b* movably mounted on the track 1 for moving along the closed path. Active and reactive elements 29, 30 are associated with the track 1 and the left and right movers 2*a*, 2*b* (see FIG. 2) are configured according to a controlled motion system well known in the art for independently driving and controlling the left and right movers 2*a*, 2*b* along the path in cooperation with a programmable controller.

As better shown in FIG. 4-9, each container-carrying unit 31 comprises one pair gripper arms 3*a*, 3*b* including a left gripper arm 3*a* pivotally connected to the left mover 2*a* by a left articulation 6*a* about a vertical axis and a right gripper arm 3*b* pivotally connected to the right mover 2*b* by a right articulation 6*b* about a vertical axis. Each container-carrying unit 31 further comprises two pairs of clamps 4*a*, 4*b*, each pair including a left clamp 4*a* mounted on the left gripper arm 3*a* and a right clamp 4*b* mounted on the right gripper arm 3*b*. The left and right clamps 4*a*, 4*b* are configured for gripping a flexible container 5 at opposite side edges thereof with the flexible container 5 hanging in a vertical position.

The left and right gripper arms 3*a*, 3*b* of each container-carrying unit 31 are linked together by a parallelism-keeping mechanism configured for keeping the left and right gripper arms 3*a*, 3*b* mutually parallel and with the left and right clamps 4*a*, 4*b* facing each other in both the straight and curved sections of the path even when a distance between the left and right articulations 6*a*, 6*b* is varied due to the relative movements of the left and right movers 2*a*, 2*b*.

In the first embodiment shown in FIGS. 1 to 9, the parallelism-keeping mechanism comprises a linear guide 8 and a guide follower 9. The linear guide 8 is provided by a guide bar rigidly attached to the right gripper arm 3*b* in a position perpendicular to the left and right gripper arms 3*a*, 3*b* and the guide follower 9 is provided by a linear bearing rigidly attached to the left gripper arm 3*a* in a position perpendicular to the left and right gripper arms 3*a*, 3*b*, with the guide follower 9 being slidingly coupled to the linear guide 8. A stop 34 at a free end of the linear guide 8 prevents the linear guide 8 from leaving the guide follower 9. It is to be understood that an equivalent inverse construction is possible, with the linear guide 8 rigidly attached to the left gripper arm 3*a* and the guide follower 9 rigidly attached to the right gripper arm 3*b*.

With this configuration, and by independently controlling the movements of each mover by means of a convenient programing of the controller of the controlled motion system, each container-carrying unit 31 is able to grip and hold a flexible container in a vertical position regardless the format of the flexible container within a set up container size range, move the flexible container forward and backward at variable speeds along the path, keep the flexible container stationary at selected positions of the path and open and close the upper opening of each flexible container either when being stationary or in motion and either in a straight or curved section of the path.

Figure 2:
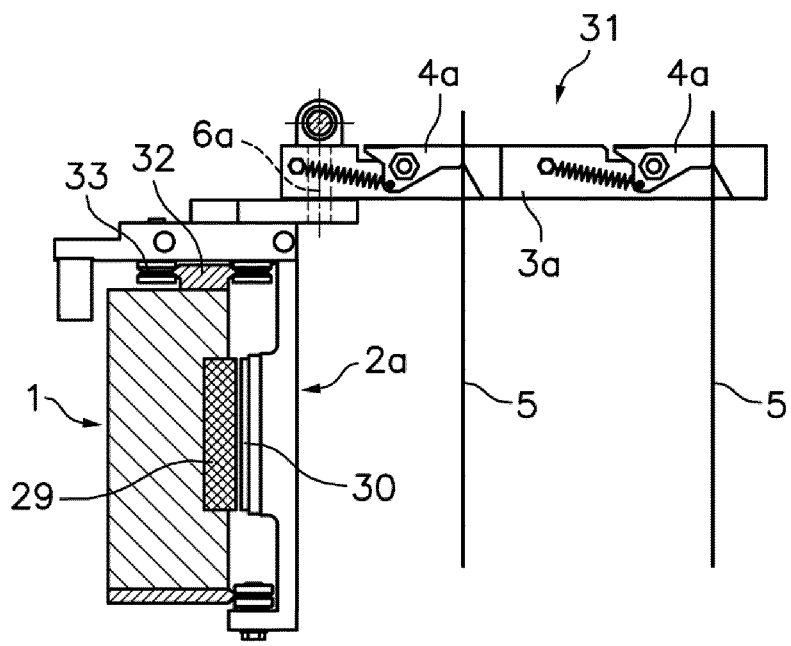
FIG. 2 is a cross-sectional view taken by the plane II-II of FIG. 1.
Figure 3:
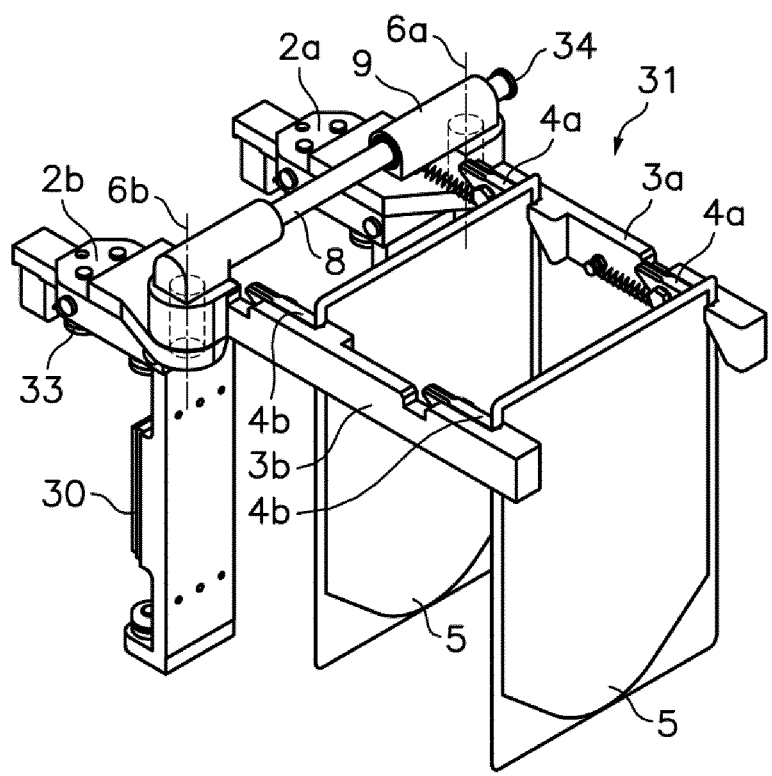
FIG. 3 is a perspective view of a container-carrying unit belonging to the conveyor device of FIG. 1 with relatively big-sized flexible containers being carried thereon.

As shown in FIG. 2, the track 1 comprises a rail 32 and the aforementioned active elements 29. The left mover 2a (symmetrical to the right mover 2b) has wheels 33 coupled to the rail 32 and the aforementioned reactive elements 30 facing the active elements 29 of the track 1. The left clamps 4a mounted on the left gripper arm 3a (symmetrical to the right clamps 4b mounted on the right gripper arm 3b) are of a well-known type shown, for example, in the cited document EP 3321195 A1.

Although in the first embodiment shown in FIGS. 1 to 9 two pairs of clamps 4a, 4b are installed in each container-carrying unit 31, it is to be understood that by virtue of the parallel condition of the left and right gripper arms 3a, 3b ensured by the parallelism-keeping mechanism either in the straight and curved sections, any number of pairs of clamps 4a, 4b can be installed in each container-carrying unit 31 for gripping an equivalent number of flexible containers 5, provided that each pair of clamps comprises one left clamp 4a mounted on the left gripper arm 3a and one right clamp 4b mounted on the right gripper arm 3b.

Figure 4:
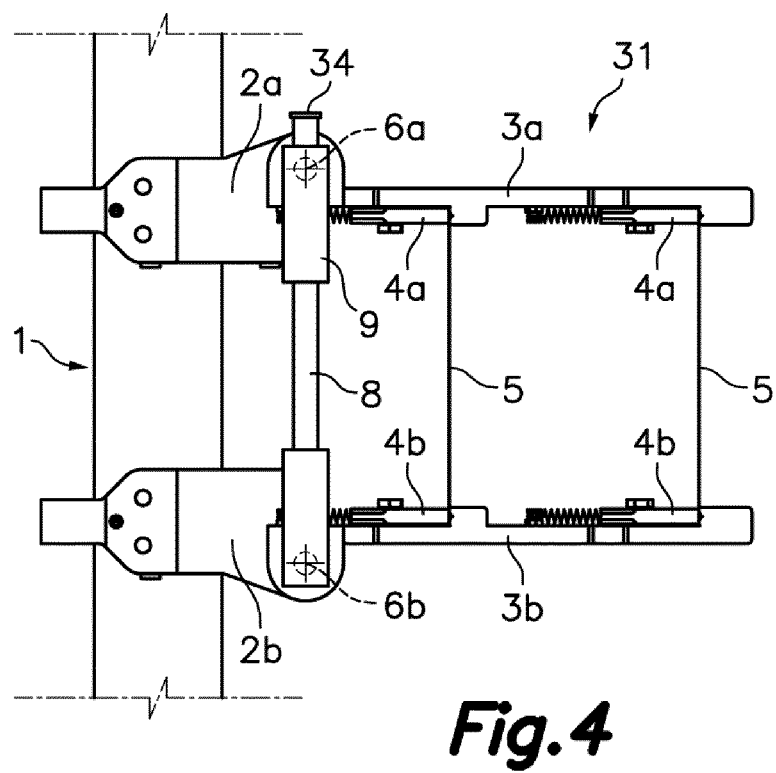
FIG. 4 is a top plan view of the container-carrying unit of FIG. 3 in a straight section of the closed path and with an upper opening of the relatively big-sized flexible containers being kept closed.

FIG. 4 shows the container-carrying unit 31 carrying two relatively big-sized flexible containers 5 within the set up size range. Relatively big-sized flexible containers means, for example, flexible containers that are more than 50% of the maximum size available within the set up size range.

FIG. 4 shows the container-carrying unit 31 in a straight section of the closed path defined by the track 1, with the two pairs of left and right clamps 4a, 4b gripping two relatively big-sized flexible containers 5 and with the left and right movers 2a, 2b keeping the left and right gripper arms 3a, 3b in suitable positions for stretching the relatively big-sized flexible containers 5 so as to keep their upper openings closed.

Figure 5:
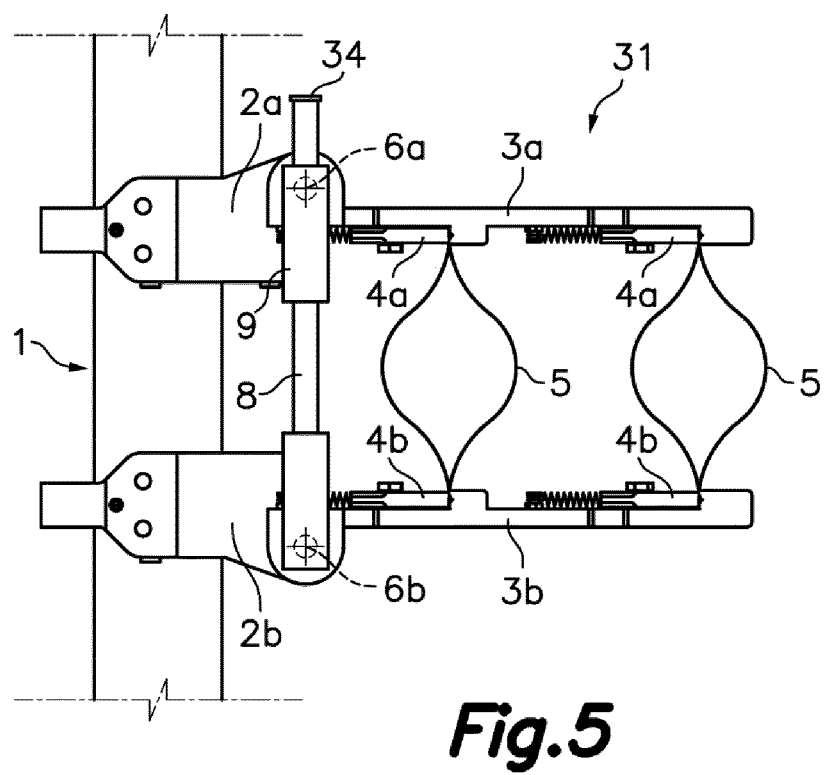
FIG. 5 is a top plan view of the container-carrying unit of FIG. 3 in a straight section of the closed path and with the upper opening of the relatively big-sized flexible containers being kept open.

FIG. 5 shows the container-carrying unit 31 in a straight section of the closed path defined by the track 1, with the two pairs of left and right clamps 4a, 4b gripping the two relatively big-sized flexible containers 5 and with the left and right movers 2a, 2b keeping the left and right gripper arms 3a, 3b in suitable positions for relaxing the relatively big-sized flexible containers 5 so as to keep their upper openings open.

Figure 6:
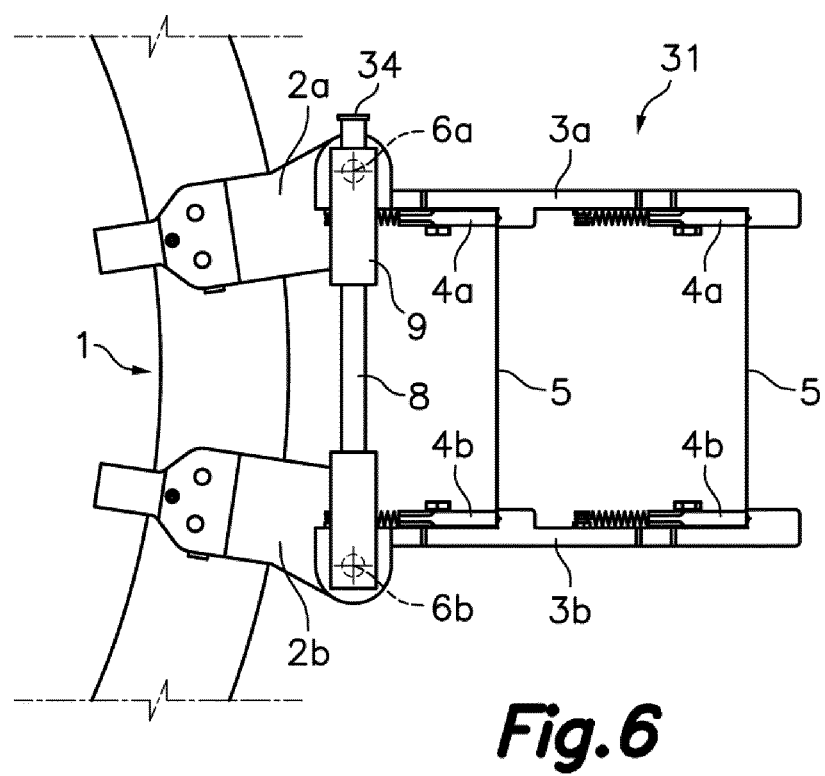
FIG. 6 is a top plan view of the container-carrying unit of FIG. 3 in a curved section of the closed path and with the upper opening of the relatively big-sized flexible containers being kept closed.

FIG. 6 shows the container-carrying unit 31 in a curved section of the closed path defined by the track 1, with the two pairs of left and right clamps 4a, 4b gripping the two relatively big-sized flexible containers 5 and with the left and right movers 2a, 2b keeping the left and right gripper arms 3a, 3b in suitable positions for stretching the relatively big-sized flexible containers 5 so as to keep their upper openings closed.

It is to be understood that, although not shown, the left and right movers 2a, 2b can be controlled for keeping the left and right gripper arms 3a, 3b in suitable positions for relaxing the two relatively big-sized flexible containers 5 so as to keep their upper openings open in a curved section of the closed path defined by the track 1.

Figure 7:
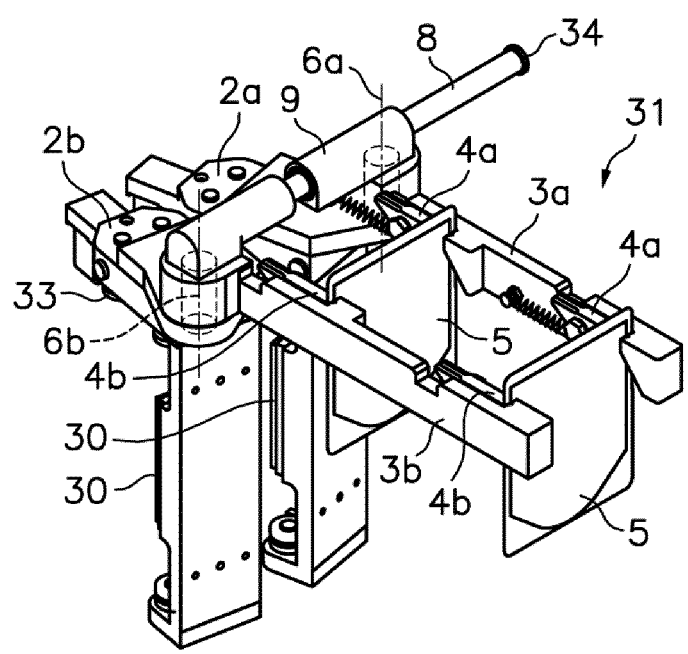
FIG. 7 is a perspective view of a container-carrying unit belonging to the conveyor device of FIG. 1 with relatively small-sized flexible containers being carried thereon.

FIG. 7 shows the container-carrying unit 31 carrying two relatively small-sized flexible containers 5 within the set up size range. Relatively small-sized flexible containers means, for example, flexible containers that are less than 50% of the maximum size available within the set up size range.

Figure 8:
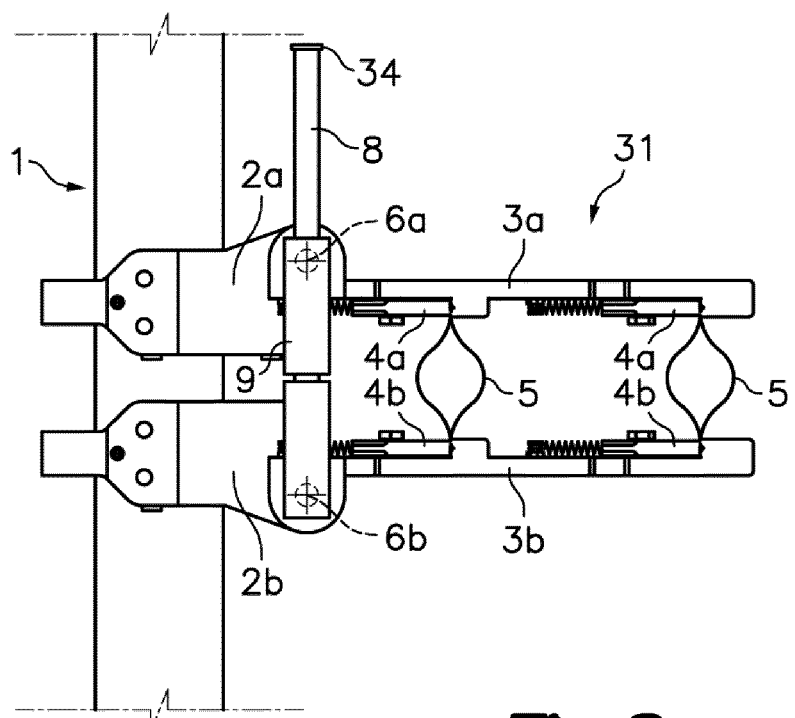
FIG. 8 is a top plan view of the container-carrying unit of FIG. 7 in a straight section of the closed path and with an upper opening of the relatively small-sized flexible containers being kept open.

FIG. 8 shows the container-carrying unit 31 in a straight section of the closed path defined by the track 1, with the two pairs of left and right clamps 4a, 4b gripping the two relatively small-sized flexible containers 5 and with the left and right movers 2a, 2b keeping the left and right gripper arms 3a, 3b in suitable positions for relaxing the relatively small-sized flexible containers 5 so as to keep their upper openings open.

It is to be understood that, although not shown, the left and right movers 2a, 2b can be controlled for keeping the left and right gripper arms 3a, 3b in suitable positions for stretching the two relatively small-sized flexible containers 5 so as to keep their upper openings closed in a straight section of the closed path defined by the track 1.

Figure 9:
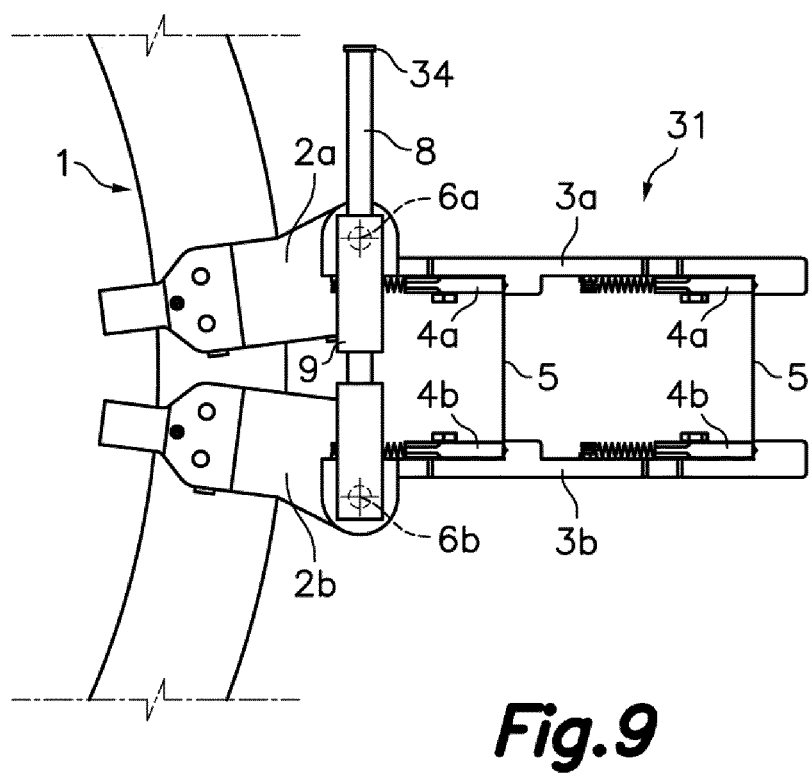
FIG. 9 is a top plan view of the container-carrying unit of FIG. 7 in a curved section of the closed path and with the upper opening of the relatively small-sized flexible containers being kept closed.

FIG. 9 shows the container-carrying unit 31 in a curved section of the closed path defined by the track 1, with the two pairs of left and right clamps 4a, 4b gripping the two relatively small-sized flexible containers 5 and with the left and right movers 2a, 2b keeping the left and right gripper arms 3a, 3b in suitable positions for stretching the flexible containers 5 so as to keep their upper openings closed.

It is to be understood that, although not shown, the left and right movers 2a, 2b can be controlled for keeping the left and right gripper arms 3a, 3b in suitable positions for relaxing the two relatively small-sized flexible containers 5 so as to keep their upper openings open in a curved section of the closed path defined by the track 1.

FIG. 10 diagrammatically shows a container-carrying unit 31 according to a first variant of the first embodiment shown in FIGS. 1 to 9, wherein a single pair of left and right clamps 4a, 4b is installed on the left and right gripper arms 3a, 3b for gripping a single flexible container 5.

FIG. 11 diagrammatically shows a container-carrying unit 31 according to a second variant of the first embodiment shown in FIGS. 1 to 9, wherein four pairs of left and right clamps 4a, 4b are installed on the left and right gripper arms 3a, 3b for gripping four flexible containers 5.

FIG. 12 diagrammatically shows a container-carrying unit 31 according to a second embodiment of the present invention comprising a left arm support 7a pivotally connected to the left mover 2a by a left articulation 6a about a vertical axis and a right arm support 7b pivotally connected to the right mover 2b by a right articulation 6b about a vertical axis. A first left gripper arm 3a and a parallel second left gripper arm 3c are rigidly fixed to the left arm support 7a. A first right gripper arm 3b and a parallel second right gripper arm 3d are rigidly fixed to the right arm support 7b. The first left gripper arm 3a, the second left gripper arm 3c, the first right gripper arm 3b and the second right gripper arm 3d are mutually parallel.

In this second embodiment, a first left clamp 4a is mounted on the first left gripper arm 3a, a second left clamp 4c is mounted on the second left gripper arm 3c, a first right clamp 4b is mounted on the first right gripper arm 3b, and a second right clamp 4d is mounted on the second right gripper arm 3d. The left and right arm supports 7a, 7b are arranged such that the first left gripper arm 3a is paired with the second right gripper arm 3d and the second left gripper arm 3c is paired with the first right gripper arm 3b, and such that the first left clamp 4a is paired with the second right clamp 4d constituting a left pair of clamps 4a, 4d and the second left clamp 4c is paired with the first right clamp 4b constituting a right pair of clamps 4c, 4b for gripping two flexible containers 5 at opposite side edges thereof with the flexible containers 5 in a vertical position.

The parallelism-keeping mechanism of the second embodiment comprises a linear guide 8 perpendicular to the first and second left and right gripper arms 3a, 3b, 3c, 3d attached to one of the left and right arm supports 7a, 7b and a guide follower 9 attached to the other of the left and right arm supports 7a, 7b and slidingly coupled to the linear guide 8 although alternative parallelism-keeping mechanism will easily occur to one skilled person.

FIG. 13 diagrammatically shows a variant of the container-carrying unit 31 according to the second embodiment, wherein two left pairs of clamps 4a, 4d and two right pairs of clamps 4b, 4c are provided for gripping four flexible containers 5, although it will be understood that any plural number of left and right pairs of clamps 4a, 4d can be provided. Each left pair of clamps comprises one first left clamp 4a mounted on the first left gripper arm 3a and one second right clamp 4d mounted on the second right gripper arm 3d. Each right pair of clamps comprises one second left clamp 4c mounted on the second left gripper arm 3c and one first right clamp 4b mounted on the first right gripper arm 3b.

FIG. 14 diagrammatically shows a container-carrying unit 31 according to a third embodiment of the present invention comprising a left gripper arm 3a pivotally connected to a left mover 2a by a left articulation 6a about a vertical axis and a right gripper arm 3b pivotally connected to a right mover 2b by a right articulation 6b about a vertical axis. The container-carrying unit 31 further comprises two pairs of clamps 4a, 4b, with each pair including a left clamp 4a mounted on the left gripper arm 3a and a right clamp 4b mounted on the right gripper arm 3b. A parallelism-keeping mechanism is provided comprising a linear guide bar 10, a left guide follower 11a attached to the left gripper arm 3a in a position perpendicular thereto and a right guide follower 11b attached to the right gripper arm 3b in a position perpendicular thereto. Both the left guide follower 11a and the right guide follower 11b are slidingly coupled to the linear guide bar 10. Preferably, stops (not shown) are provided at both free ends of the linear guide bar 10 to prevent the linear guide bar 10 from leaving the left and right guide followers 11a, 11b.

FIG. 15 diagrammatically shows a container-carrying unit 31 according to a fourth embodiment of the present invention comprising a left gripper arm 3a pivotally connected to a left mover 2a by a left articulation 6a about a vertical axis and a right gripper arm 3b pivotally connected to a right mover 2b by a right articulation 6b about a vertical axis. The container-carrying unit 31 further comprises two pairs of clamps 4a, 4b, with each pair including a left clamp 4a mounted on the left gripper arm 3a and a right clamp 4b mounted on the right gripper arm 3b, although it is to be understood that any number of pairs of clamps 4a, 4b can be provided.

In this fourth embodiment, a parallelism-keeping mechanism is provided comprising a left linear guide 12a attached to the left gripper arm 3a in a position parallel thereto and a right linear guide 12b attached to the right gripper arm 3b in a position parallel thereto, a first rocker bar 13a and a second rocker bar 13b. The first rocker bar 13a has a first end pivotally connected to the left gripper arm 3a by a left articulation 14a about a vertical axis and a second end pivotally connected to a right guide follower 15b slidingly coupled to the right linear guide 12b. The second rocker bar 13b has a first end pivotally connected to the right gripper arm 3b by a right articulation 14b about a vertical axis and a second end pivotally connected to a left guide follower 15a slidingly coupled to the left linear guide 12a. The first and second rocker bars 13a, 13b are further pivotally connected to one another at an intermediate crossing point thereof by an intermediate articulation 16 about a vertical axis.

Figure 16:
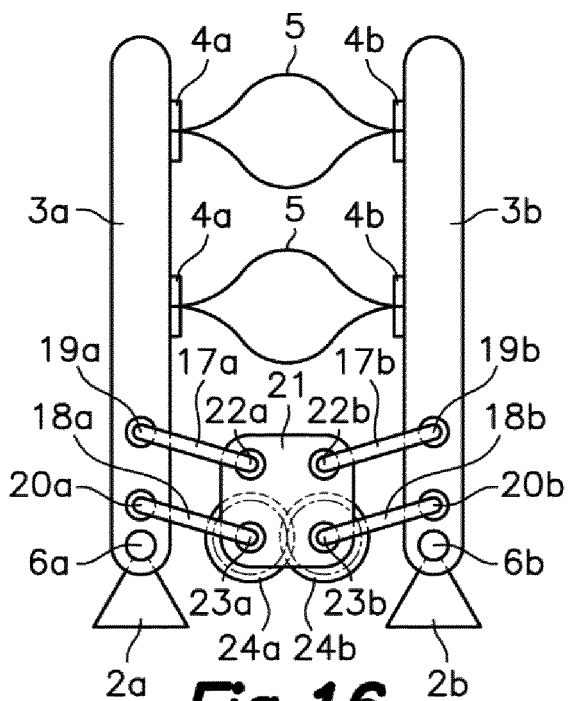
FIG. 16 is a top plan diagrammatic view of a container-carrying unit belonging to a conveyor device for conveying flexible containers along a packaging line according to a fifth embodiment of the present invention.

FIG. 16 diagrammatically shows a container-carrying unit 31 according to a fifth embodiment of the present invention comprising a left gripper arm 3a pivotally connected to a left mover 2a by a left articulation 6a about a vertical axis and a right gripper arm 3b pivotally connected to a right mover 2b by a right articulation 6b about a vertical axis. The container-carrying unit 31 further comprises two pairs of clamps 4a, 4b, with each pair including a left clamp 4a mounted on the left gripper arm 3a and a right clamp 4b mounted on the right gripper arm 3b, although it is to be understood that any number of pairs of clamps 4a, 4b can be provided.

In this fifth embodiment, a parallelism-keeping mechanism is provided comprising an intermediate body 21, first and second left rocker bars 17a, 18a and first and second right rocker bars 17b, 18b. The first and second left rocker bars 17a, 18a have respective first ends pivotally connected to the left gripper arm 3a by respective first and second left articulations 19a, 20a about vertical axes and respective second ends pivotally connected to the intermediate body 21 by respective first and second left intermediate articulations 22a, 23a about vertical axes. The first and second right rocker bars 17b, 18b have respective first ends pivotally connected to the right gripper arm 3b by respective first and second right articulations 19b, 20b about vertical axes and respective second ends connected to the intermediate body 21 by respective first and second right intermediate articulations 22b, 23b about vertical axes.

The distances between the first and second left articulations 19a, 20a and the first and second left intermediate articulations 22a, 23a are configured such that the first and second left rocker bars 17a, 18a, the left gripper arm 3a and the intermediate body 21 form together a left articulated parallelogram. The distances between the first and second right articulations 19b, 20b and the first and second right intermediate articulations 22b, 23b are configured such that the first and second right rocker bars 17b, 18b, the right gripper arm 3b and the intermediate body 21 form together a right articulated parallelogram symmetric of the left articulated parallelogram.

In the fifth embodiment shown in FIG. 16, the parallelism-keeping mechanism further comprises left and right toothed wheels 24a, 24b coaxial to the second left and right intermediate articulations 23a, 23b. The left and right toothed wheels 24a, 24b are rigidly fixed to the second left and right rocker bars 18a, 18b, respectively, and mutually meshed. The left and right toothed wheels 24a, 24b have a same diameter, thereby the angles rotated by the first and second left rocker bars 17a, 18a are equal to the angles rotated by the first and second right rocker bars 17b, 18b when the left and right gripper arms 3a, 3b are moved towards each other or away from each other. This keeps the left and right clamps 4a, 4b of each pair mutually facing each other.

Figure 17:
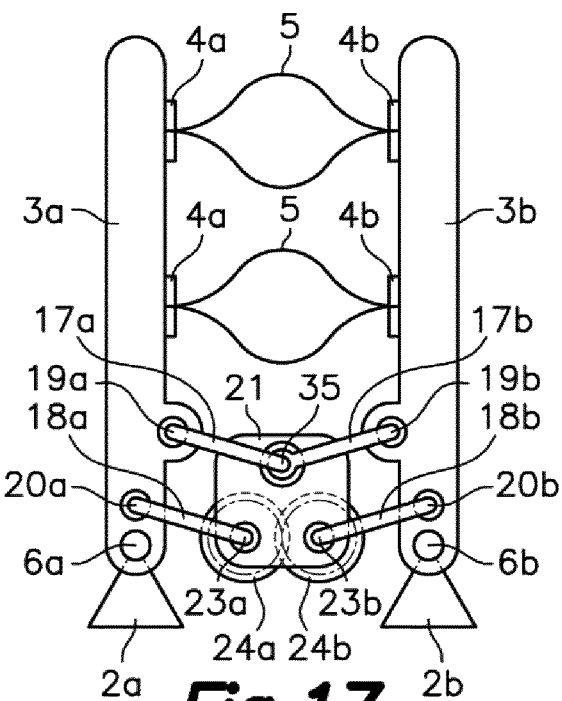
FIG. 17 is a top plan diagrammatic view of a first variant of the container-carrying unit shown in FIG. 16.

FIG. 17 diagrammatically shows a first variant of the container-carrying unit 31 of the fifth embodiment which only differs from the fifth embodiment shown in FIG. 16 in that the second ends of the first left and right rocker bars 17a, 17b are pivotally connected to the intermediate body 21 by a central coaxial articulation 35 about a common vertical axis.

Figure 18:
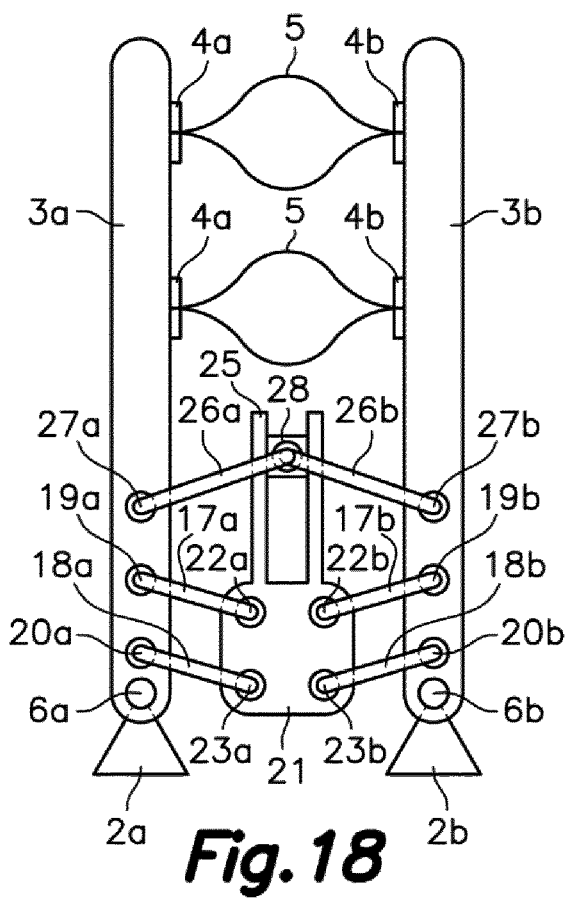
FIG. 18 is a top plan diagrammatic view of a second variant of the container-carrying unit shown in FIG. 16.

FIG. 18 diagrammatically shows a second variant of the container-carrying unit 31 of the fifth embodiment shown in FIG. 16, wherein the parallelism-keeping mechanism comprises, instead of the left and right toothed wheels 24a, 24b, an intermediate linear guide 25 rigidly attached to the intermediate body 21 in a position parallel to the left and right gripper arms 3a, 3b, as well as a third left rocker bar 26a and a third right rocker bar 26b. The third left rocker bar 26a has a first end pivotally connected to the left gripper arm 3a by a third left articulation 27a about a vertical axis and a second end pivotally connected to a guide follower 28 slidingly coupled to the intermediate linear guide 25. The third right rocker bar 26b has a first end pivotally connected to the right gripper arm 3b by a third right articulation 27b about a vertical axis and a second end pivotally connected to the guide follower 28. The intermediate linear guide 25 protrudes outwardly from the intermediate body 21 and the connections of the second ends of the third left and right rocker bars 26a, 26b to the guide follower 28 are coaxial.

Figure 19:
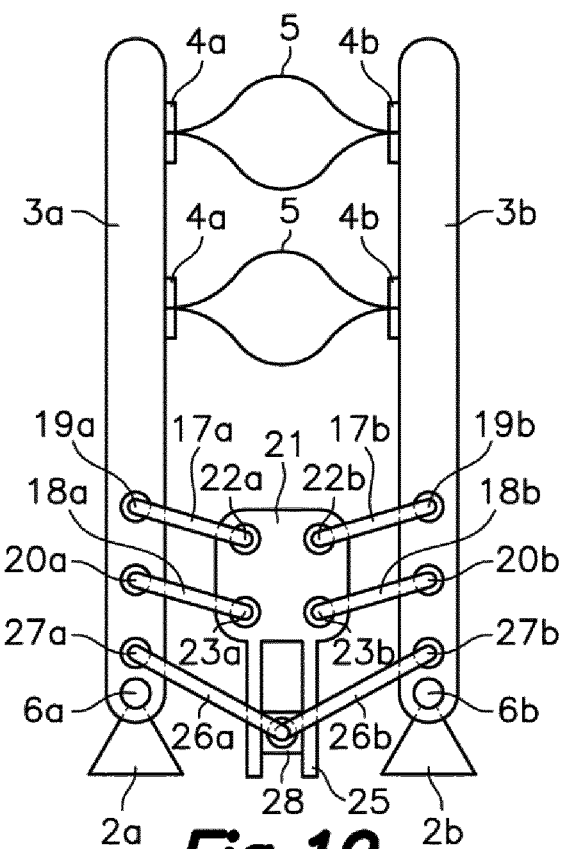
FIG. 19 is a top plan diagrammatic view of a third variant of the container-carrying unit shown in FIG. 16.

FIG. 19 diagrammatically shows a third variant of the container-carrying unit 31 of the fifth embodiment which only differs from the second variant shown in FIG. 18 in that the intermediate linear guide 25 protrudes inwardly from the intermediate body 21.

The scope of the invention is defined in the attached claims.

The invention claimed is:

1. A conveyor device for conveying flexible containers along a packaging line, comprising:
   a track (1) defining a closed path;
   at least one pair of movers (2a, 2b) including a left mover (2a) and a right mover (2b) movably mounted on the track (1) for moving along the path;
   active and reactive (29, 30) elements associated with the track (1) and the left and right movers (2a, 2b) and configured for independently driving and controlling the left and right movers (2a, 2b) along the path;
   at least one pair of gripper arms (3a, 3b) including a left gripper arm (3a) connected to the left mover (2a) and a right gripper arm (3b) connected to the right mover (2b);
   at least one pair of clamps (4a, 4b) including a left clamp (4a) mounted on the left gripper arm (3a) and a right clamp (4b) mounted on the right gripper arm (3b), the left and right clamps (4a, 4b) being configured for gripping a flexible container (5) at opposite side edges thereof with the flexible container (5) in a vertical position;
characterized in that:
   the closed path defined by the track (1) lays in a horizontal plane and includes straight and curved sections;
   the left gripper arm (3a) is pivotally connected to the left mover (2a) by a left articulation (6a) about a vertical axis and the right gripper arm (3b) is pivotally connected to the right mover (2b) by a right articulation (6b) about a vertical axis;
   the left and right gripper arms (3a, 3b) are linked together by a parallelism-keeping mechanism configured for keeping the left and right gripper arms (3a, 3b) mutually parallel and with the left and right clamps (4a, 4b) facing each other in both the straight and curved sections of the path even when a distance between the left and right articulations (6a, 6b) is varied due to relative movements of the left and right movers (2a, 2b).

2. The conveyor device of claim 1, wherein:
   the left gripper arm (3a) is a first left gripper arm (3a) fixed to a left arm support (7a) and the right gripper arm (3b) is a first right gripper arm (3b) fixed to a right arm support (7b);
   a second left gripper arm (3c) parallel to the first left gripper arm (3a) is fixed to the left arm support (7a) and a second right gripper arm (3d) parallel to the first right gripper arm (3b) is fixed to the right arm support (7b);
   the left arm support (7a) is pivotally connected to the left mover (2a) by the left articulation (6a) and the right arm support (7b) is pivotally connected to the right mover (2b) by the right articulation (6b);
   the left clamp (4a) is a first left clamp (4a) mounted on the first left gripper arm (3a) and the right clamp (4b) is a first right clamp (4b) mounted on the first right gripper arm (3b);
   a second left clamp (4c) is mounted on the second left gripper arm (3c) and a second right clamp (4d) is mounted on the second right gripper arm (3d);
   the second left clamp (4c) is paired with the first right clamp (4b) and the second right clamp (4d) is paired with the first left clamp (4a) for gripping a pair of flexible containers (5) at opposite side edges thereof with the flexible containers (5) in a vertical position.

3. The conveyor device of claim 2, wherein a plurality of left pairs of clamps (4a, 4d) and a plurality of right pairs of clamps (4b, 4c) are provided for gripping a plurality of flexible containers (5), each left pair of clamps comprising one first left clamp (4a) mounted on the first left gripper arm (3a) and one second right clamp (4d) mounted on the second right gripper arm (3d), and each right pair of clamps comprising one second left clamp (4c) mounted on the second left gripper arm (3c) and one first right clamp (4b) mounted on the first right gripper arm (3b).

4. The conveyor device of claim 3, wherein the parallelism-keeping mechanism comprises a linear guide (8) perpendicular to the first and second left and right gripper arms (3a-3d) attached to one of the left and right arm supports (7a, 7b) and a guide follower (9) attached to the other of the left and right arm supports (7a, 7b) and slidingly coupled to the linear guide (8).

5. The conveyor device of claim 2, wherein the parallelism-keeping mechanism comprises a linear guide (8) perpendicular to the first and second left and right gripper arms (3a-3d) attached to one of the left and right arm supports (7a, 7b) and a guide follower (9) attached to the other of the left and right arm supports (7a, 7b) and slidingly coupled to the linear guide (8).

6. The conveyor device of claim 1, wherein a plurality of pairs of clamps (4a, 4b) are provided for gripping a plurality of flexible containers (5), each pair of clamps comprising one left clamp (4a) mounted on the left gripper arm (3a) and one right clamp (4b) mounted on the right gripper arm (3b).

7. The conveyor device of claim 6, wherein the parallelism-keeping mechanism comprises a linear guide (8) perpendicular to the left and right gripper arms (3a, 3b) attached to one of the left and right gripper arms (3a, 3b) and a guide follower (9) attached to the other of the left and right gripper arms (3a, 3b) and slidingly coupled to the linear guide (8).

8. The conveyor device of claim 6, wherein the parallelism-keeping mechanism comprises a linear guide bar (10), a left guide follower (11a) perpendicular to the left gripper arm (3a) attached to the left gripper arm (3a) and slidingly coupled to the linear guide bar (10) and a right guide follower (11b) perpendicular to the right gripper arm (3b) attached to the right gripper arm (3b) and slidingly coupled to the linear guide bar (10).

9. The conveyor device of claim 6, wherein the parallelism-keeping mechanism comprises a left linear guide (12a) parallel and attached to the left gripper arm (3a), a right linear guide (12b) parallel and attached to the right gripper arm (3b), a first rocker bar (13a) having a first end pivotally connected to the left gripper arm (3a) by a left articulation (14a) about a vertical axis and a second end pivotally connected to a right guide follower (15b) slidingly coupled to the right linear guide (12b), and a second rocker bar (13b) having a first end pivotally connected to the right gripper arm (3b) by a right articulation (14b) about a vertical axis and a second end pivotally connected to a left guide follower (15a) slidingly coupled to the left linear guide (12a), wherein the first and second rocker bars (13a, 13b) are pivotally connected to one another at an intermediate crossing point thereof by an intermediate articulation (16) about a vertical axis.

10. The conveyor device of claim 6, wherein the parallelism-keeping mechanism comprises:
first and second left rocker bars (17a, 18a) having respective first ends pivotally connected to the left gripper arm (3a) by respective first and second left articulations (19a, 20a) about vertical axes and respective second ends pivotally connected to an intermediate body (21) by respective first and second left intermediate articulations (22a, 23a) about vertical axes;
first and second right rocker bars (17b, 18b) having respective first ends pivotally connected to the right gripper arm (3b) by respective first and second right articulations (19b, 20b) about vertical axes and respective second ends connected to the intermediate body (21) by respective first and second right intermediate articulations (22b, 23b) about vertical axes;
wherein the first and second left rocker bars (17a, 18a), the left gripper arm (3a) and the intermediate body (21) form together a left articulated parallelogram and the first and second right rocker bars (17b, 18b), the right gripper arm (3b) and the intermediate body (21) form together a right articulated parallelogram.

11. The conveyor device of claim 10, wherein the parallelism-keeping mechanism further comprises mutually meshed left and right toothed wheels (24a, 24b) coaxial to the second left and right intermediate articulations (23a, 23b) and fixed to the second left and right rocker bars (18a, 18b), respectively, wherein the left and right toothed wheels (24a, 24b) have a same diameter.

12. The conveyor device of claim 10, wherein the parallelism-keeping mechanism further comprises an intermediate linear guide (25) parallel to the left and right gripper arms (3a, 3b) attached to the intermediate body (21), a third left rocker bar (26a) having a first end pivotally connected to the left gripper arm (3a) by a third left articulation (27a) about a vertical axis and a second end pivotally connected to a guide follower (28) slidingly coupled to the intermediate linear guide (25), and a third right rocker bar (26b) having a first end pivotally connected to the right gripper arm (3b) by a third right articulation (27b) about a vertical axis and a second end pivotally connected to the guide follower (28).

13. The conveyor device of claim 1 or 6, wherein the parallelism-keeping mechanism comprises a linear guide (8) perpendicular to the left and right gripper arms (3a, 3b) attached to one of the left and right gripper arms (3a, 3b) and a guide follower (9) attached to the other of the left and right gripper arms (3a, 3b) and slidingly coupled to the linear guide (8).

14. The conveyor device of claim 1, wherein the parallelism-keeping mechanism comprises a linear guide bar (10), a left guide follower (11a) perpendicular to the left gripper arm (3a) attached to the left gripper arm (3a) and slidingly coupled to the linear guide bar (10) and a right guide follower (11b) perpendicular to the right gripper arm (3b) attached to the right gripper arm (3b) and slidingly coupled to the linear guide bar (10).

15. The conveyor device of claim 1, wherein the parallelism-keeping mechanism comprises a left linear guide (12a) parallel and attached to the left gripper arm (3a), a right linear guide (12b) parallel and attached to the right gripper arm (3b), a first rocker bar (13a) having a first end pivotally connected to the left gripper arm (3a) by a left articulation (14a) about a vertical axis and a second end pivotally connected to a right guide follower (15b) slidingly coupled to the right linear guide (12b), and a second rocker bar (13b) having a first end pivotally connected to the right gripper arm (3b) by a right articulation (14b) about a vertical axis and a second end pivotally connected to a left guide follower (15a) slidingly coupled to the left linear guide (12a), wherein the first and second rocker bars (13a, 13b) are pivotally connected to one another at an intermediate crossing point thereof by an intermediate articulation (16) about a vertical axis.

16. The conveyor device of claim 1, wherein the parallelism-keeping mechanism comprises:
first and second left rocker bars (17a, 18a) having respective first ends pivotally connected to the left gripper arm (3a) by respective first and second left articulations (19a, 20a) about vertical axes and respective second ends pivotally connected to an intermediate body (21) by respective first and second left intermediate articulations (22a, 23a) about vertical axes;
first and second right rocker bars (17b, 18b) having respective first ends pivotally connected to the right gripper arm (3b) by respective first and second right articulations (19b, 20b) about vertical axes and respective second ends connected to the intermediate body (21) by respective first and second right intermediate articulations (22b, 23b) about vertical axes;
wherein the first and second left rocker bars (17a, 18a), the left gripper arm (3a) and the intermediate body (21) form together a left articulated parallelogram and the first and second right rocker bars (17b, 18b), the right gripper arm (3b) and the intermediate body (21) form together a right articulated parallelogram.

17. The conveyor device of claim 16, wherein the parallelism-keeping mechanism further comprises mutually meshed left and right toothed wheels (24a, 24b) coaxial to the second left and right intermediate articulations (23a, 23b) and fixed to the second left and right rocker bars (18a, 18b), respectively, wherein the left and right toothed wheels (24a, 24b) have a same diameter.

18. The conveyor device of claim 16, wherein the parallelism-keeping mechanism further comprises an intermediate linear guide (25) parallel to the left and right gripper arms (3a, 3b) attached to the intermediate body (21), a third left rocker bar (26a) having a first end pivotally connected to the left gripper arm (3a) by a third left articulation (27a) about a vertical axis and a second end pivotally connected to a guide follower (28) slidingly coupled to the intermediate linear guide (25), and a third right rocker bar (26b) having a first end pivotally connected to the right gripper arm (3b) by a third right articulation (27b) about a vertical axis and a second end pivotally connected to the guide follower (28).

* * * * *